United States Patent
Wang

(10) Patent No.: US 10,003,706 B2
(45) Date of Patent: Jun. 19, 2018

(54) IMAGE FORMING APPARATUS, METHOD FOR CONTROLLING IMAGE FORMING APPARATUS, AND STORAGE MEDIUM TO SHIFT POWER STATES

(71) Applicant: CANON KABUSHIKI KAISHA, Tokyo (JP)

(72) Inventor: Xiaoli Wang, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days. days.

(21) Appl. No.: 14/740,117

(22) Filed: Jun. 15, 2015

(65) Prior Publication Data

US 2015/0373222 A1 Dec. 24, 2015

(30) Foreign Application Priority Data

Jun. 19, 2014 (JP) ................................. 2014-126270

(51) Int. Cl.
*H04N 1/00* (2006.01)
(52) U.S. Cl.
CPC ............................. H04N 1/00891 (2013.01)
(58) Field of Classification Search
CPC .......... H04N 1/00904; H04N 1/00037; H04N 1/00082; H04N 1/00896; H04N 2201/006; H04N 2201/0094
USPC .......... 358/1.15, 1.9, 1.13, 1.14; 399/37, 88
See application file for complete search history.

(56) References Cited

U.S. PATENT DOCUMENTS

| | | | |
|---|---|---|---|
| 2007/0079363 A1* | 4/2007 | Itoh .......................... | H04N 1/44 726/5 |
| 2008/0010477 A1* | 1/2008 | Nakamura ......... | H04N 1/00885 713/323 |
| 2009/0119525 A1* | 5/2009 | Morimoto .............. | B41J 29/393 713/323 |
| 2011/0176160 A1* | 7/2011 | Manabe ............. | G06K 15/4055 358/1.14 |
| 2013/0031394 A1* | 1/2013 | Hayashi ................ | G06F 1/3209 713/323 |
| 2013/0128305 A1* | 5/2013 | Grabkowitz ....... | H04N 1/00225 358/1.15 |

FOREIGN PATENT DOCUMENTS

| | | | | |
|---|---|---|---|---|
| CN | 1746818 A | 3/2006 | | |
| CN | 102739898 A | 10/2012 | | |
| JP | 2004227064 A | 8/2004 | | |
| JP | 2010218120 A | * 9/2010 | .............. | B41J 29/38 |
| JP | 2014049955 A | 3/2014 | | |

\* cited by examiner

*Primary Examiner* — Jamares Q Washington
(74) *Attorney, Agent, or Firm* — Canon U.S.A., Inc. IP Division

(57) ABSTRACT

An image forming apparatus including a Universal Serial Bus (USB) device interface further includes a detection unit, a first selection unit, and a control unit. The detection unit detects a factor for shifting the image forming apparatus to a power saving state. The first selection unit allows a user to select whether to maintain or stop power supply to the USB device interface in the power saving state. The control unit controls the power supply to the USB device interface according to the selection by the user using the first selection unit when the detection unit detects the factor.

10 Claims, 10 Drawing Sheets

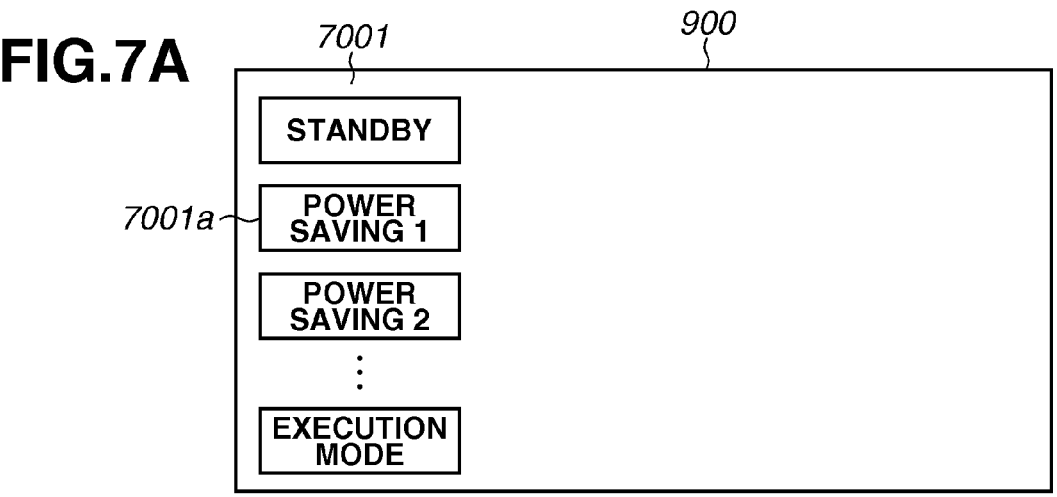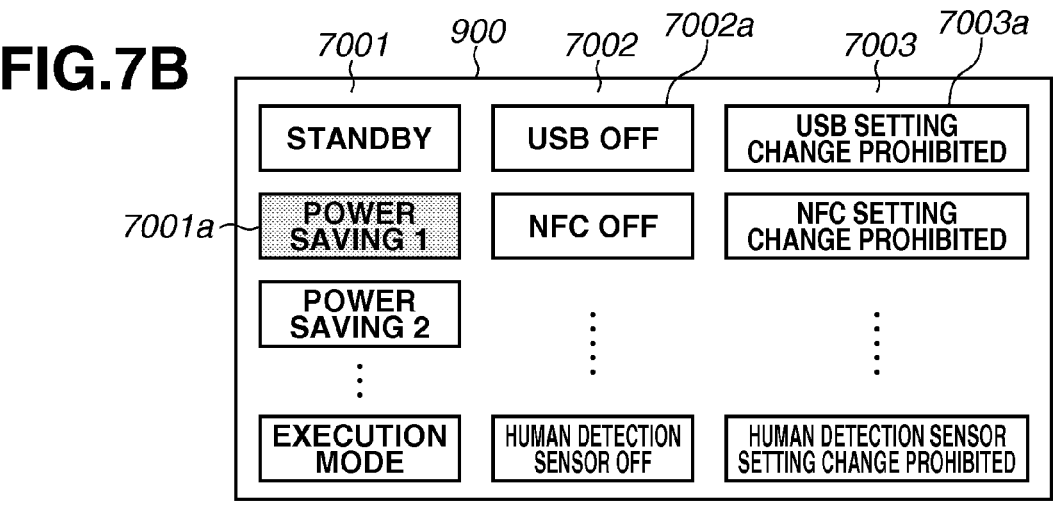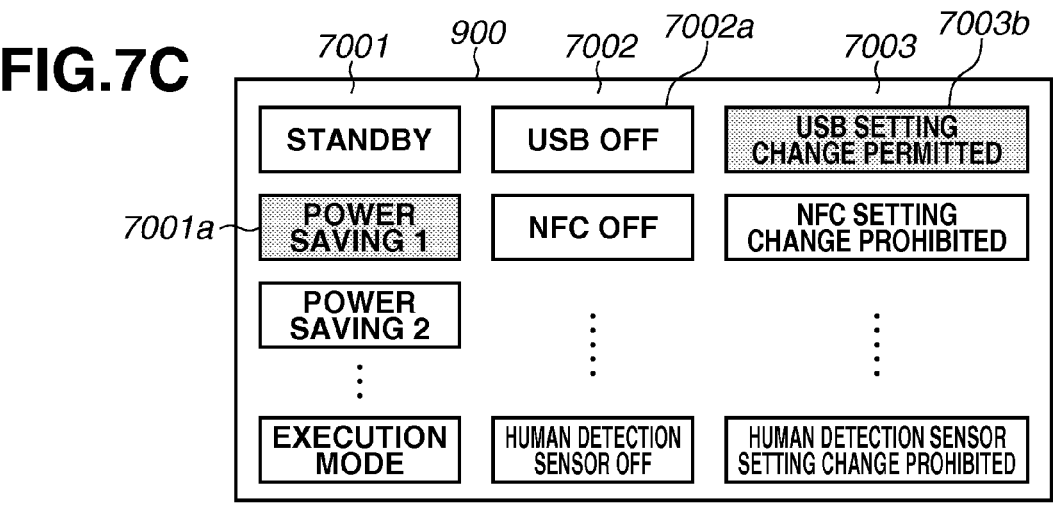

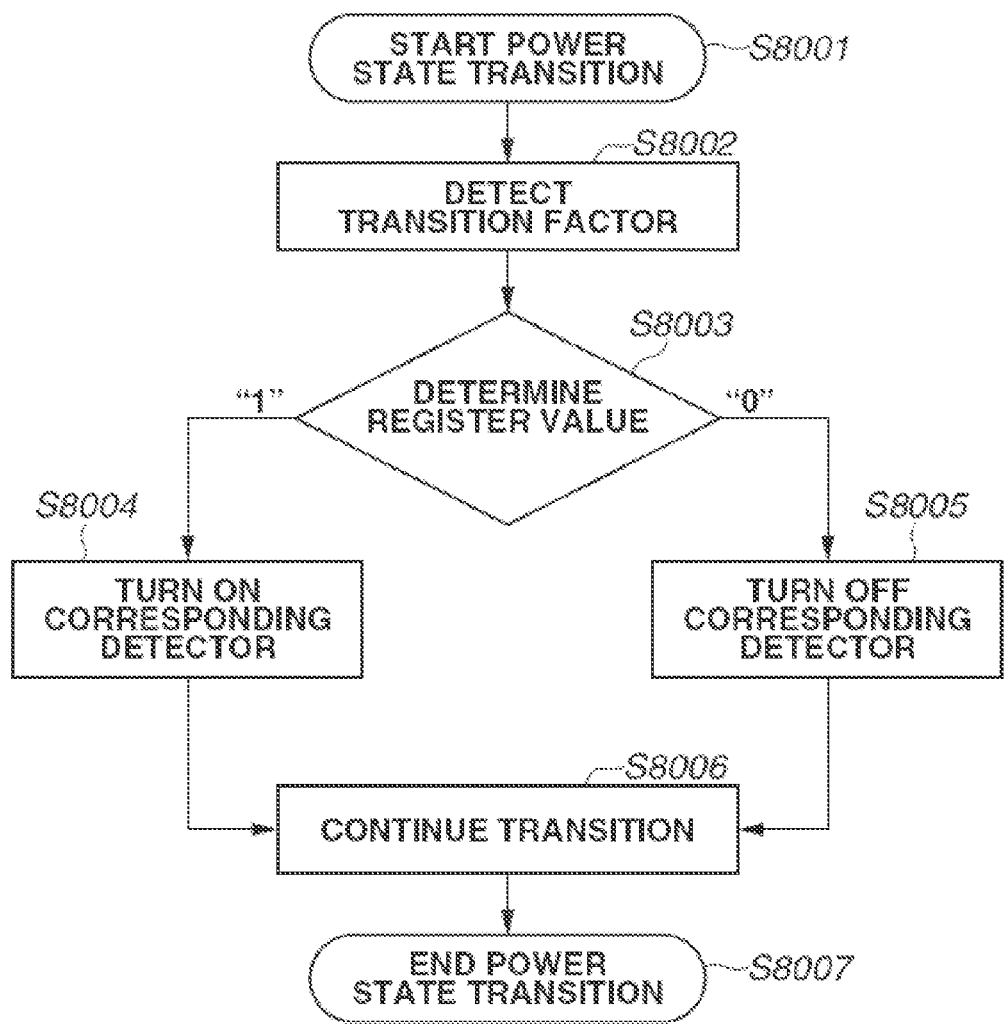

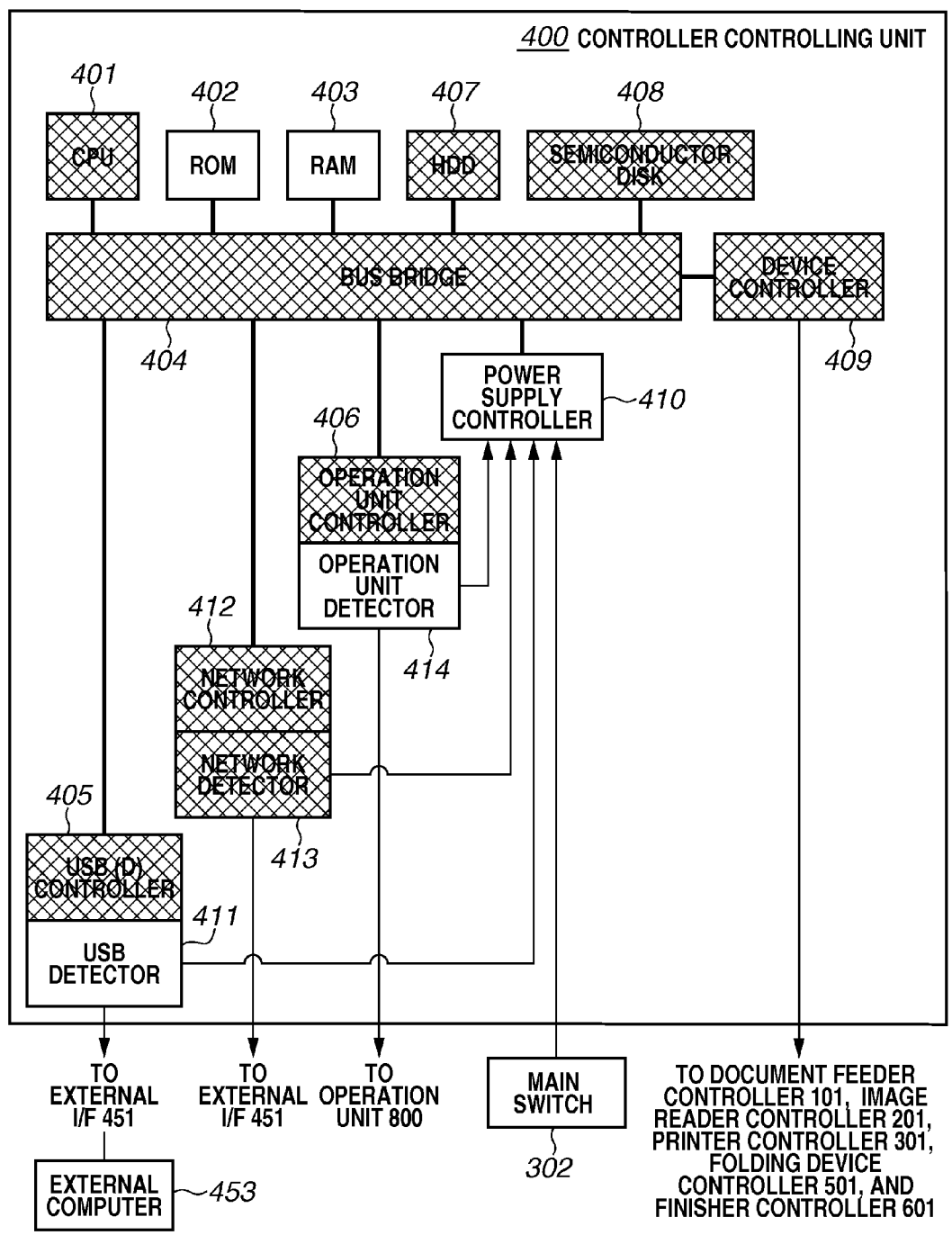

IMAGE FORMING APPARATUS, METHOD FOR CONTROLLING IMAGE FORMING APPARATUS, AND STORAGE MEDIUM TO SHIFT POWER STATES

BACKGROUND OF THE INVENTION

Field of the Invention

The present invention relates to an image forming apparatus that operates in one of a plurality of power modes, a method for controlling the image forming apparatus, and a storage medium.

Description of the Related Art

In recent years, with an increasing concern over the environment, many devices having environmentally friendly functions have been commercialized. Such functions include, for example, an energy saving mode (hereinafter referred to as "power saving mode"). An image forming apparatus has a power saving mode as well. The image forming apparatus is controlled to continue the power saving mode as long as possible while the image forming apparatus is not in use, depending on the usage status and wait time of the user of the image forming apparatus.

However, as the image forming apparatus has become multifunctional, the usage patterns of users and the contents of function settings have become various. As a result, an increasing number of standby modes are provided in the power saving mode, leading to variations in the power consumption in the power saving mode. Accordingly, the number of factors for returning the image forming apparatus from the power saving mode has also increased. In other words, the ways of shifting to and returning from the power saving mode have become complicated and difficult to control.

For example, a Universal Serial Bus (USB) controller can be connected or disconnected at an arbitrary timing by a user's personal computer (PC) serving as a USB host device. It is also known that on the image forming apparatus side, the standby mode of the power saving mode is changed depending on the connection or disconnection of the USB host device.

Japanese Patent Application Laid-Open No. 2004-227064 discusses a technique for controlling the operations in an apparatus by recognizing the connection or disconnection of a USB host device based on a VBUS signal of a USB. In Japanese Patent Application Laid-Open No. 2004-227064, VBUS connection or disconnection is associated with the operation of a component in the apparatus. For example, when the VBUS connection is detected, a print job may be received from a PC, and therefore the VBUS connection is associated with turning ON of a printer. Similarly, the VBUS disconnection is associated with turning OFF of the printer to maintain low power consumption.

Such a configuration can realize responsiveness at the time of the VBUS connection, and power saving at the time of the VBUS disconnection. However, this configuration may not be able to meet the needs of all users. For example, in an environment where a job can be received via a network even if the VBUS is disconnected, there may be many users who desire to maintain the responsiveness while keeping the printer turned ON even after the VBUS is disconnected.

SUMMARY OF THE INVENTION

The present invention is directed to an image forming apparatus that allows a user to select whether to prioritize power saving or responsiveness (usability) of the image forming apparatus, and achieves a balance between the power saving and the responsiveness (usability) of the image forming apparatus according to the usage environment.

According to an aspect of the present invention, an image forming apparatus including a Universal Serial Bus (USB) device interface includes a detection unit configured to detect a factor for shifting the image forming apparatus to a power saving state, a first selection unit configured to allow a user to select whether to maintain or stop power supply to the USB device interface in the power saving state, and a control unit configured to control the power supply to the USB device interface according to the selection by the user using the first selection unit when the detection unit detects the factor.

Further features of the present invention will become apparent from the following description of exemplary embodiments with reference to the attached drawings.

BRIEF DESCRIPTION OF THE DRAWINGS

FIGS. 7A, 7B, and 7C are diagrams each illustrating power state settings and change permission/prohibition settings performed by an administrator.

FIG. 8 is a flowchart illustrating a power state setting of a detector in a power state transition.

FIG. 9 is a diagram illustrating power states in the controller controlling unit after a power state transition.

DESCRIPTION OF THE EMBODIMENTS

An exemplary embodiment of the present invention will be described in detail below with reference to the drawings. Components described in the exemplary embodiment are merely examples and are not intended to limit the scope of the present invention.

Figure 1:
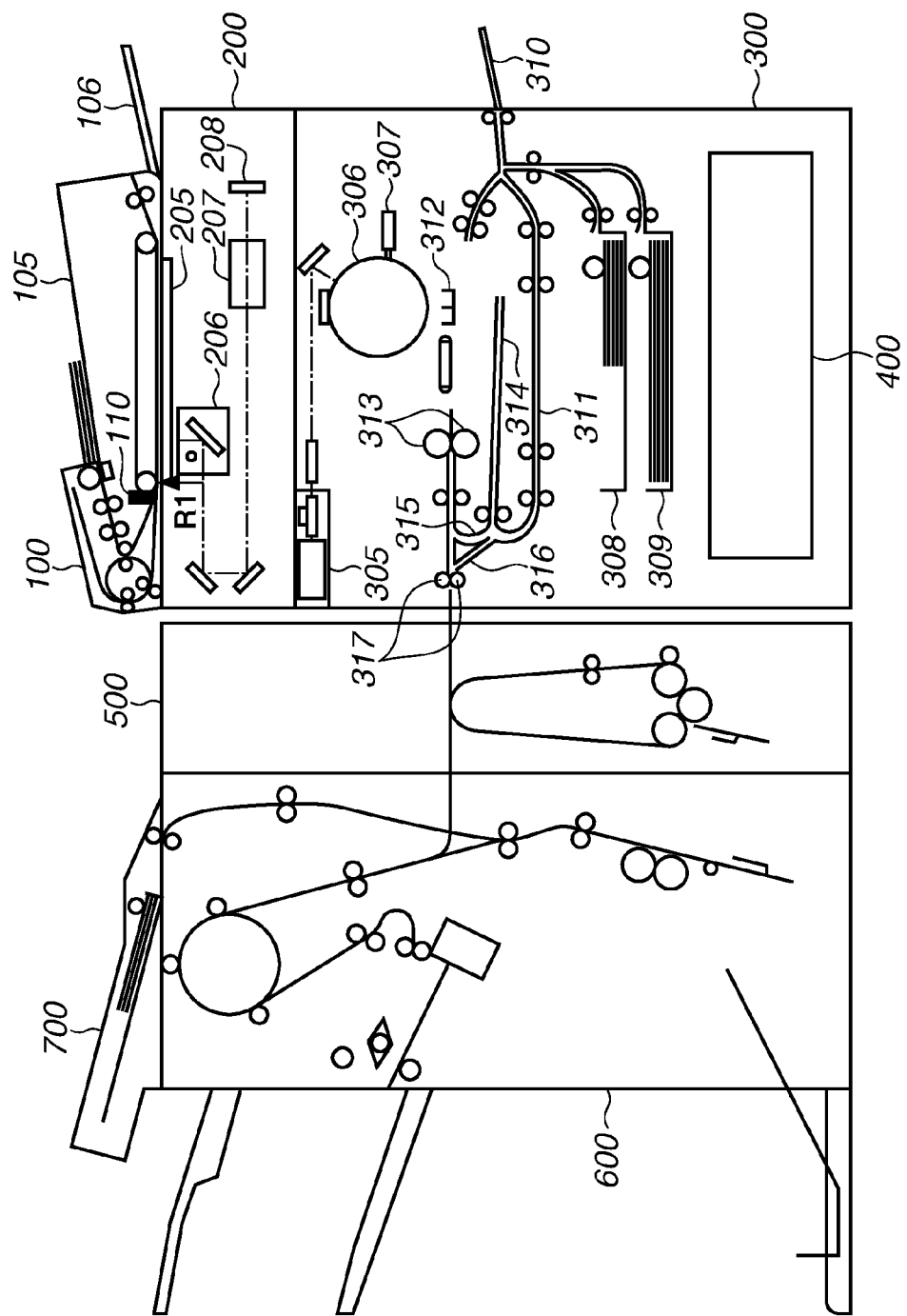
FIG. 1 is a cross-sectional view illustrating a configuration of an image forming apparatus according to an exemplary embodiment of the present invention.

FIG. 1 is a cross-sectional view illustrating a configuration of an image forming apparatus according to an exemplary embodiment of the present invention.

The image forming apparatus according to the present exemplary embodiment includes an image reader 200 serving as a document reading unit, and a main body of the image forming apparatus including a printer unit 300 serving as an image forming unit. The image forming apparatus further includes a folding device 500 and a finisher 600. A document feeder 100 is mounted on the upper part of the image reader 200.

The document feeder 100 sequentially feeds the documents placed on a document tray 105 one by one from the first page, and conveys each of the documents onto a platen glass 205 via a curved path. A method for reading a one-sided document includes a fixed document-reading mode and a moving document-reading mode. In the fixed document-reading mode, the document is conveyed so that the rear end of the document stops at a reading position R1 on the platen glass 205, and then a scanner unit 206 moves from left to right to read the document. In the moving document-reading mode, the document being conveyed at a certain reading speed is read at the reading position R1 by the scanner unit 206 that is fixed at the reading position R1. In either mode, the read document is discharged to a paper discharge tray 106.

For reading a two-sided document, there is a method of reading the front side of the document by using the scanner unit 206, and reading the back side of the document by using an optical unit 110 disposed in the document feeder 100. This will be described in detail below. Components such as an image sensor and a light source (not illustrated) are disposed in the optical unit 110.

A document image read by an image sensor 208 via a lens 207 is transmitted to an exposure controller 305. The exposure controller 305 outputs a laser beam according to an image signal. When a photosensitive drum 306 is irradiated with the laser beam, an electrostatic latent image is formed on the photosensitive drum 306. A developing unit 307 develops the electrostatic latent image on the photosensitive drum 306 with a developer. A transfer unit 312 transfers the developer on the photosensitive drum 306 onto a sheet fed from any of a cassette 308, a cassette 309, a manual sheet feeder 310, and a two-sided conveyance path 311.

The sheet to which the developer has been transferred is guided to a fixing unit 313, and then subjected to fixing processing to fix the developer to the sheet. The sheet having passed through the fixing unit 313 is guided from a path 315 to a path 314 by a flapper (not illustrated). After the rear end of the sheet exits the path 315, the sheet is switched back and then guided from a path 316 to a discharge roller 317. The sheet can thereby be discharged from the printer unit 300 by the discharge roller 317 while a surface of the sheet to which the developer is transferred is in the state of facing downward (is faced down). This is called reverse discharge. By discharging the sheet in such a face-down state, image forming can be performed in a correct page order from the first page, when, for example, images obtained by reading a plurality of documents fed by the document feeder 100 are to be printed.

When an image is to be formed on a hard sheet such as an overhead projector (OHP) sheet supplied from the manual sheet feeder 310, the sheet is discharged from the discharge roller 317 without being guided to the path 315, while a surface of the sheet to which the developer is transferred is in the state of facing upward (is faced up).

Further, when an image is to be formed on both sides of a sheet, the sheet is guided from the fixing unit 313 to the path 315 and then the path 314. Immediately after the rear end of the sheet exits the path 315, the sheet is switched back, and then guided to the two-sided conveyance path 311 by a flapper (not illustrated). The transfer unit 312 again transfers an electrostatic latent image onto the sheet guided to the two-sided conveyance path 311. The sheet is then subjected to the fixing processing by the fixing unit 313.

Path lengths, roller arrangements, and segmentation of a driving system are determined so that as many as five sheets of a half size such as A4 and B5 can be conveyed on the round path described above, which starts from the transfer unit 312 and returns to the transfer unit 312 via the two-sided conveyance path 311. The page discharge order in such processes is that sheets are discharged with odd-numbered pages facing downward, so that the correct page order can be obtained in double-sided copying.

The sheet discharged from the discharge roller 317 is fed into the folding device 500. The folding device 500 subjects the sheet to folding processing for z-folding. When the folding processing is specified for an A3-size sheet or a B4-size sheet, the sheet is fed into the finisher 600 after being subjected to the folding processing by the folding device 500. However, a sheet of any other size is directly fed into the finisher 600. The finisher 600 performs processing such as bookbinding, binding, and punching. Further, an inserter 700 is provided on the finisher 600, and conveys sheets such as a cover and an interleaf to the finisher 600.

Figure 2:
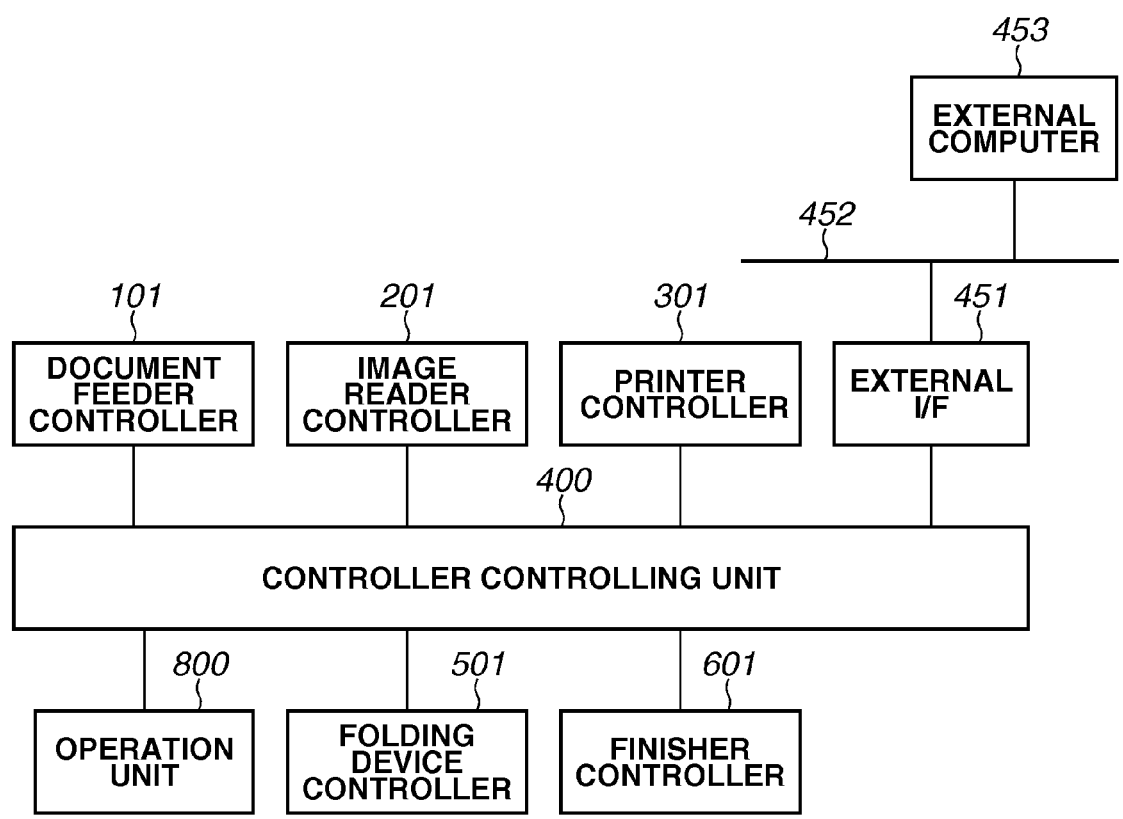
FIG. 2 is a block diagram illustrating a control configuration of the image forming apparatus.

FIG. 2 is a block diagram illustrating a control configuration of the image forming apparatus.

Controllers of the image forming apparatus according to the present exemplary embodiment are configured around a controller controlling unit 400 that comprehensively controls the image forming apparatus. The controller controlling unit 400 communicates with the image reader 200, the printer unit 300, the folding device 500, and the finisher 600 to comprehensively control the image forming apparatus.

A document feeder controller 101 controls the document feeder 100 based on a setting via an operation unit 800 and an instruction from an external computer 453. An image reader controller 201 controls the image reader 200. A printer controller 301 controls the printer unit 300. A folding device controller 501 controls the folding device 500. A finisher controller 601 controls the finisher 600.

The controller controlling unit 400 communicates with the document feeder controller 101 and the image reader controller 201 to acquire image data of an input document. Further, the controller controlling unit 400 communicates with the printer controller 301 to print the image data on a sheet. Furthermore, the controller controlling unit 400 communicates with the folding device controller 501 and the finisher controller 601 to obtain a desired output by performing processing such as stapling and punching on the sheet with an image printed thereon.

An external interface (I/F) 451 is provided to connect the controller controlling unit 400 to the external computer 453. When the external I/F 451 is, for example, connected to the network controller 412, the external I/F 451 is a network interface 451 and, when the external I/F 451 is connected to the USB (D) controller 405, the external I/F 451 is a Universal Serial Bus (USB) interface 451 and the USB (D) controller 405 is a USB device interface controller 405. For example, the external I/F 451 is connected to the external computer 453 via an external bus 452 such as a network and a USB.

The controller controlling unit 400 rasterizes print data received from the external computer 453 via the external I/F 451, into an image and outputs the image. Further, the controller controlling unit 400 transmits the image data stored in a hard disk device (HDD) 407 illustrated in FIG. 3 (described below) to the external computer 453 via the external I/F 451.

Figure 3:
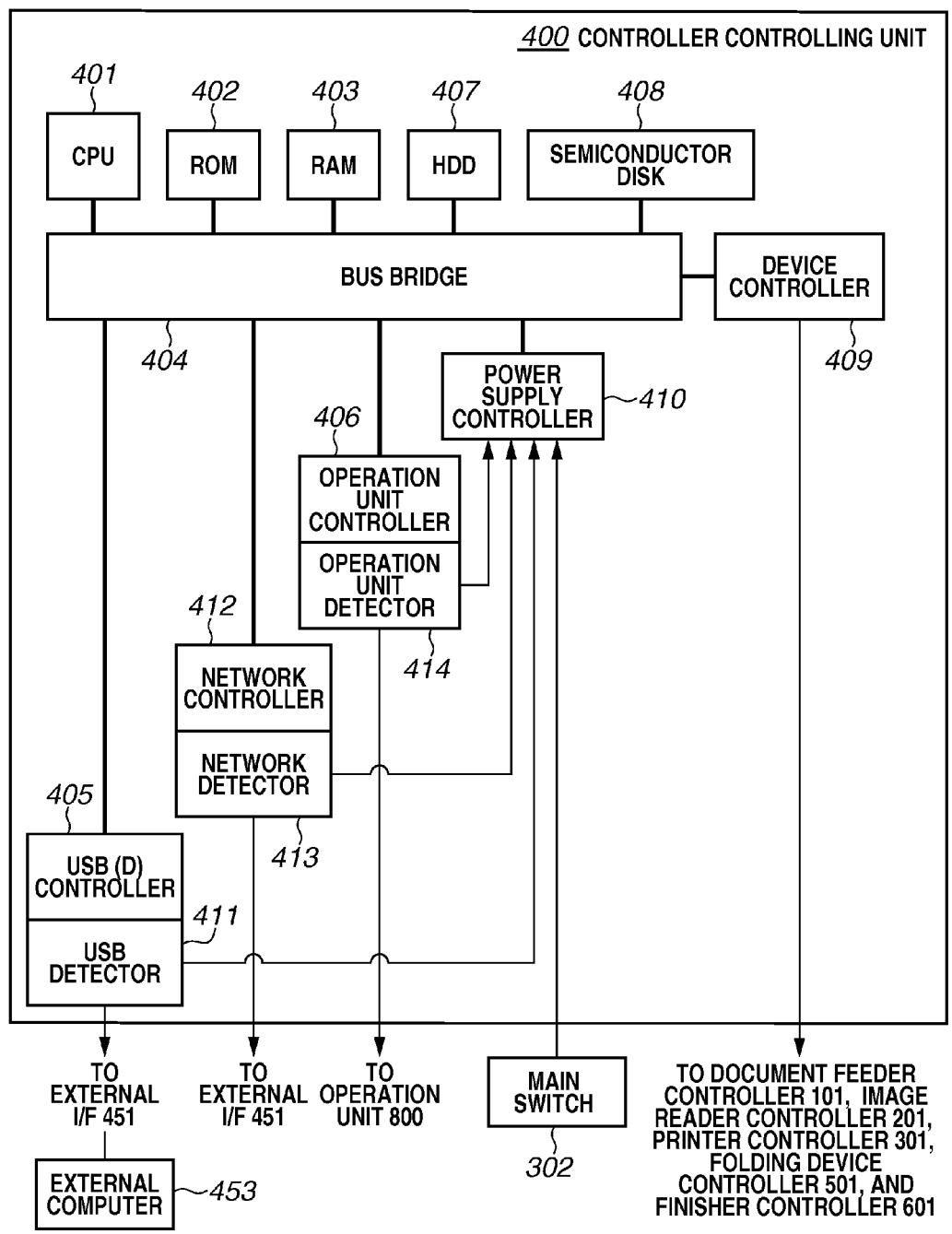
FIG. 3 is a block diagram illustrating a configuration of a controller controlling unit.

FIG. 3 is a block diagram illustrating a configuration of the controller controlling unit 400.

The controller controlling unit 400 includes a central processing unit (CPU) 401. The CPU 401 executes an operating system (hereinafter referred to as "OS") and other programs stored in a read only memory (ROM) 402, a semiconductor disk 408, and the like, thereby controlling the controller controlling unit 400.

The ROM 402 stores an initial activation program of the CPU 401. A random access memory (RAM) 403 is provided to temporarily hold control data of the CPU 401, and used as a work area for calculation associated with the control.

The semiconductor disk 408 stores a main program including the OS of the CPU 401. The HDD 407 is used to store the image data acquired by a user, and images edited using the operation unit 800 to be described below.

A USB (D) controller 405 is a USB device interface controller for controlling a USB interface 451, as an example of the external I/F 451. A network controller 412 controls a network interface 451, as an example of the external I/F 451. An operation unit controller 406 controls the operation unit 800.

The controller controlling unit 400 further includes a bus bridge 404 to which the CPU 401, the ROM 402, the RAM 403, the HDD 407, the semiconductor disk 408, the USB (D) controller 405, the network controller 412, the operation unit controller 406, a power supply controller 410, and a device controller 409 are connected.

The CPU 401 communicates with the device controller 409 via the bus bridge 404. The device controller 409 is connected to the document feeder controller 101, the image reader controller 201, the printer controller 301, the folding device controller 501, and the finisher controller 601, to control these controllers.

The power supply controller 410 controls power supply to the entire image forming apparatus. The power supply controller 410 is, for example, a complex programmable logic device (CPLD). For example, the power supply controller 410 detects the state of a main switch 302 and controls power supply by turning ON or OFF the power of the entire image forming apparatus. The power supply controller 410 also controls power supply to the document feeder controller 101, the image reader controller 201, the printer controller 301, the folding device controller 501, and the finisher controller 601, via the device controller 409.

Furthermore, the power supply controller 410 implements power supply control for a plurality of power saving modes of the image forming apparatus. The power supply controller 410 is not limited to the CPLD, and may be any device as long as similar power supply control can be performed.

The controller controlling unit 400 includes detectors (a USB detector 411, a network detector 413, and an operation unit detector 414) for detecting return factors of the image forming apparatus. Each of the detectors is configured to operate with power only enough to detect the corresponding return factors.

The USB detector 411 monitors, in the USB (D) controller 405, insertion or removal of a device and communication with the device via a USB interface 451, which is an example of the external I/F 451. For example, when the return factors related to the USB (D) controller 405 are receipt of a print job, receipt of a predetermined inquiry job, and detection of a VBUS signal, the USB detector 411 monitors and detects the occurrence of these events. The VBUS signal is provided to supply power from a USB host device, such as the external computer 453, to a USB peripheral device via a USB interface 451, which is an example of the external I/F 451, and is connected to the USB detector 411. The USB detector 411 can detect supply of the VBUS signal (e.g., supply of power, or bus power, from the external computer 453).

The network detector 413 monitors, in the network controller 412, communication with a device via a network. For example, when the return factors related to the network controller 412 are receipt of a print job and receipt of a predetermined inquiry job, the network detector 413 monitors and detects the occurrence of these events.

The operation unit detector 414 monitors operations via the operation unit 800, in the operation unit controller 406.

For example, when the return factor related to the operation unit controller 406 is a press of a power saving key 804 illustrated in FIG. 5 to be described below, the operation unit detector 414 monitors and detects the occurrence of the press.

The power supply controller 410 can perform operation to the USB (D) controller 405, the network controller 412, and the operation unit controller 406 via the bus bridge 404. With the operation, the power supply controller 410 can control whether to energize the USB detector 411, the network detector 413, and the operation unit detector 414. For example, with the operation, the power supply controller 410 can independently turn ON and OFF switches (not illustrated) each provided at a power line for supplying power to each of the USB detector 411, the network detector 413, and the operation unit detector 414.

Figure 5:
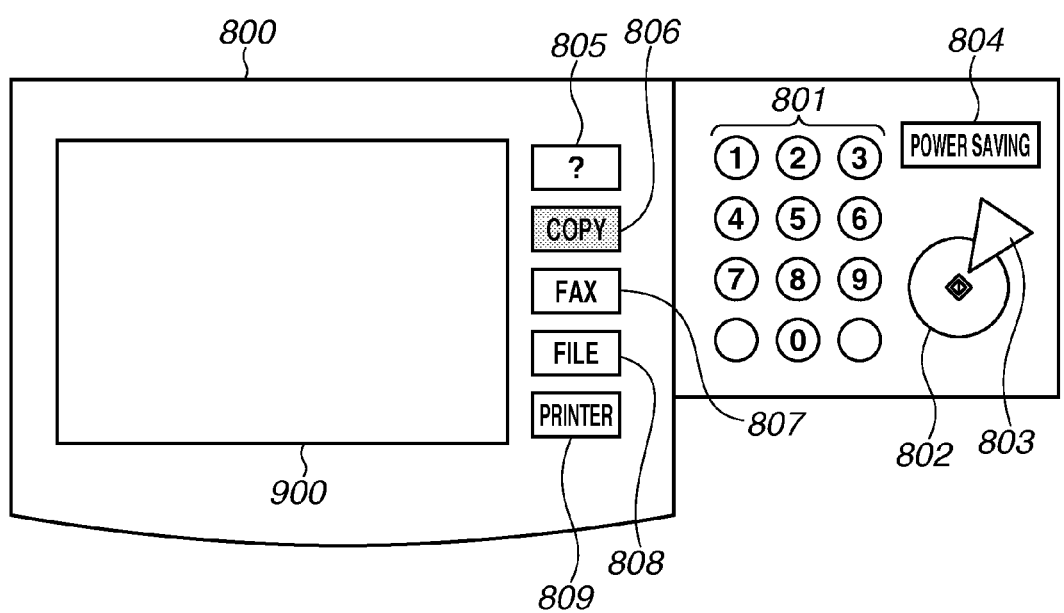
FIG. 5 is a diagram illustrating a configuration of an operation unit.

While the image forming apparatus is in the power saving mode, when the power saving key 804 of the operation unit 800 illustrated in FIG. 5 is pressed, for example, the operation unit detector 414 detects the operation, and notifies the power supply controller 410 of the detection of the operation, thereby causing a return from the power saving mode. In this case, the operation unit detector 414 is energized only in a portion that can detect the press of the power saving key 804.

Further, while the image forming apparatus is in a predetermined power saving mode, the USB detector 411 and the network detector 413 may, for example, receive a print job or a predetermined inquiry job via the USB interface and the network interface, respectively. In this case, the USB detector 411 and the network detector 413 detect the job and then notify the power supply controller 410 of the detection of the receipt of the job, thereby causing a return from the power saving mode. In this case, the USB detector 411 and the network detector 413 are energized only in a portion that can detect the receipt of the print job or the receipt of the predetermined inquiry job. After returning from the power saving mode, the image forming apparatus can start a print operation and an operation for responding to the inquiry.

In a transition from a normal operation mode to the power saving mode, the power supply controller 410 can instruct the USB (D) controller 405 and the network controller 412 to turn OFF the USB detector 411 and the network detector 413, respectively, so as to set the USB detector 411 and the network detector 413 to the OFF state and set only the operation unit detector 414 to the ON state. In this case, when the power saving key 804 is pressed, the image forming apparatus can return from the power saving mode to the normal operation mode.

The above-described turning ON or OFF of the USB detector 411 and the network detector 413 is merely an example, and can be changed by setting.

Figure 4:
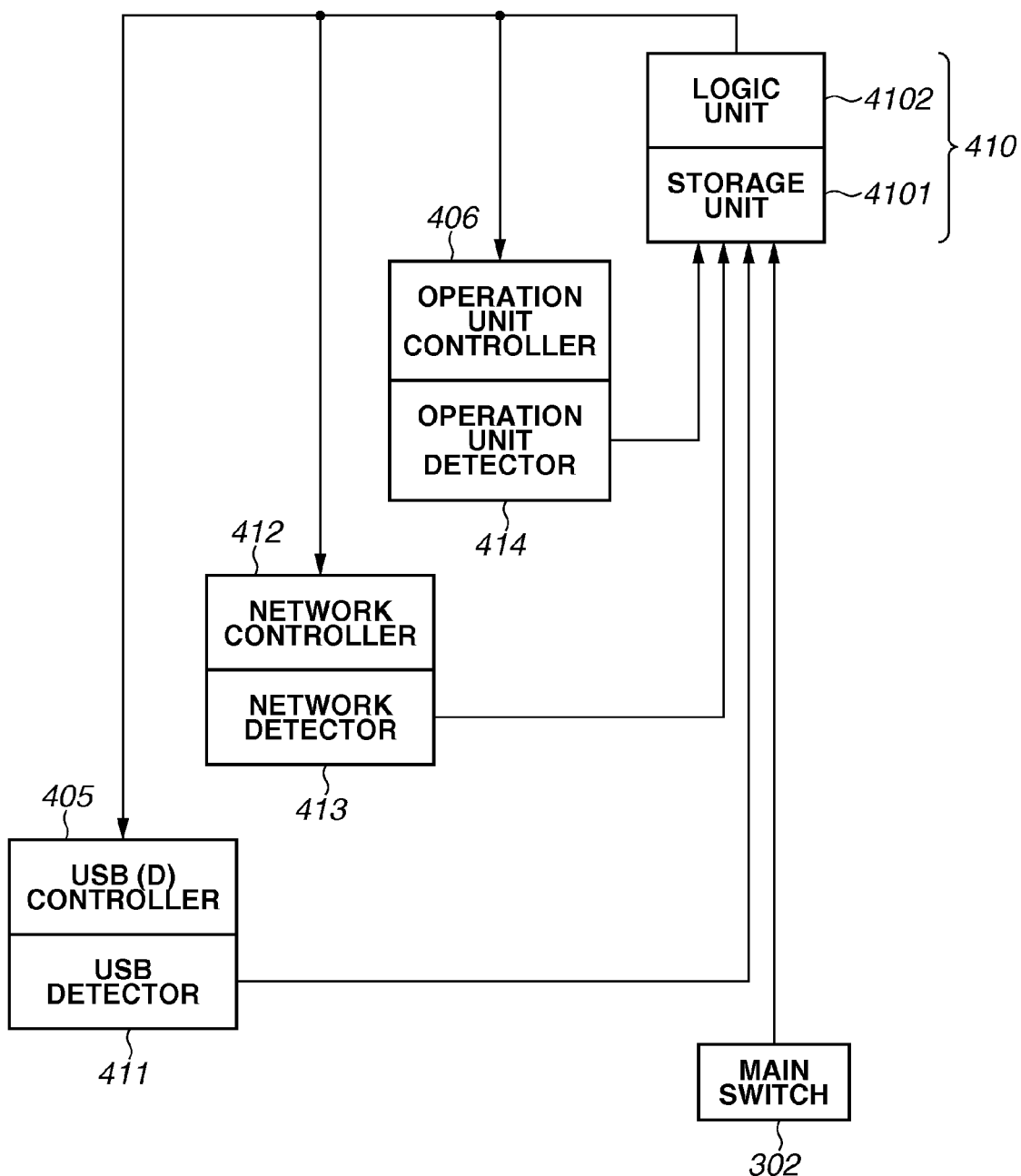
FIG. 4 is a diagram illustrating a configuration of a power supply controller.

FIG. 4 is a diagram illustrating a configuration of the power supply controller 410.

The power supply controller 410 includes a storage unit 4101 and a logic unit 4102, as illustrated in FIG. 4. The storage unit 4101 stores the power status of each of the USB detector 411, the network detector 413, and the operation unit detector 414. The storage unit 4101 also stores the power status of each of detectors such as a near field communication (NFC) unit, a human detection sensor, a document detection sensor, and a manual feeding sheet detection sensor, which are not illustrated, as well as the main switch 302. The storage unit 4101 further stores user settings as illustrated in, for example, FIGS. 6A to 6C to be described below. The logic unit 4102 controls the power state of each of the detectors by executing a program stored in advance.

The NFC unit represents a device that implements near field communication, and performs noncontact communication with a device based on a standard such as Felicity Card (FeliCa), International Standards Organization/International Electrotechnical Commission (ISO/IEC) 14443 (MIkron FARE-collection System (MIFARE)), and ISO/IEC 18092. The human detection sensor is, for example, an infrared sensor to detect a human body in proximity to the image forming apparatus. The human detection sensor is used, for example, to return the image forming apparatus from the power saving mode by detecting a user approaching the image forming apparatus. The document detection sensor detects placement of a document on the platen glass 205 of the image reader 200 or in the document tray 105 of the document feeder 100 in the image forming apparatus. The document detection sensor is used, for example, to return the image forming apparatus from the power saving mode by detecting placement of a document in the document tray 105 or the like. The manual feeding sheet detection sensor detects placement of a sheet in the manual sheet feeder 310 of the image forming apparatus. The manual feeding sheet detection sensor is used, for example, to return the image forming apparatus from the power saving mode by detecting placement of a sheet on the manual sheet feeder 310.

The storage unit 4101 is connected to the USB detector 411, the network detector 413, the operation unit detector 414, the NFC unit, the human detection sensor, the main switch 302, and the like, and collectively stores the statuses of these components. The storage unit 4101 also stores the user settings to be described below. The storage unit 4101 includes a plurality of registers, and uses the registers to store the power status of each of the detectors and the user settings.

The logic unit 4102 performs device control in a power state transition, based on the statuses and user settings stored in the storage unit 4101. For example, the logic unit 4102 can power ON or OFF the USB detector 411, the network detector 413, and the operation unit detector 414 via the USB (D) controller 405, the network controller 412, the operation unit controller 406, respectively, based on the user settings.

FIG. 5 is a diagram illustrating a configuration of the operation unit 800.

The operation unit 800 includes a liquid crystal display (LCD) display unit 900. The LCD display unit 900 has a touch panel sheet attached on an LCD, and displays an operation screen of the image forming apparatus. When any of displayed keys is pressed, the LCD display unit 900 transmits information of the pressed position to the controller controlling unit 400.

A numeric keypad 801 is used to input a number such as the number of copies. A start key 802 is used to start a copy operation, a document reading operation, and the like after the user sets desired conditions. A stop key 803 is used to stop an operation being performed. The power saving key 804 is used by the user to shift from the normal operation mode to the power saving mode, or to return from the power saving mode to the normal operation mode.

Further, when the function of a key is unclear, pressing a guide key 805 can display an explanation of the key. A copy mode key 806 is used to perform copying. A facsimile (FAX) key 807 is used to make settings for the facsimile. A file key 808 is used to output file data. A printer key 809 is used to make settings including a setting for a print output from an external device such as a computer.

Figure 6A:
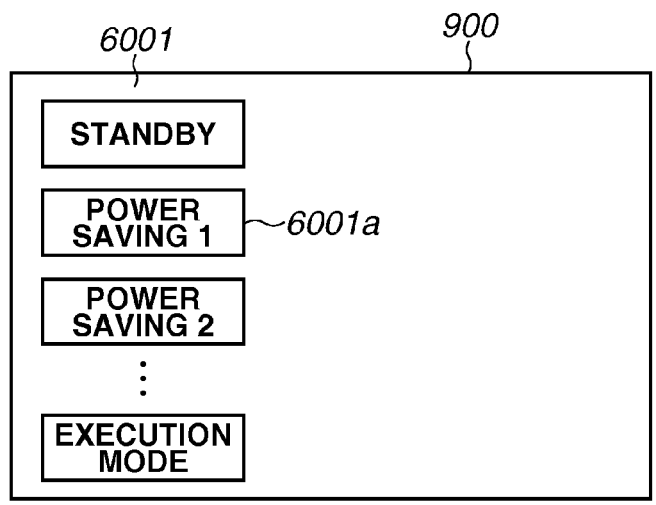
FIGS. 6A, 6B, and 6C are diagrams each illustrating power state settings performed by a user.
Figure 6B:
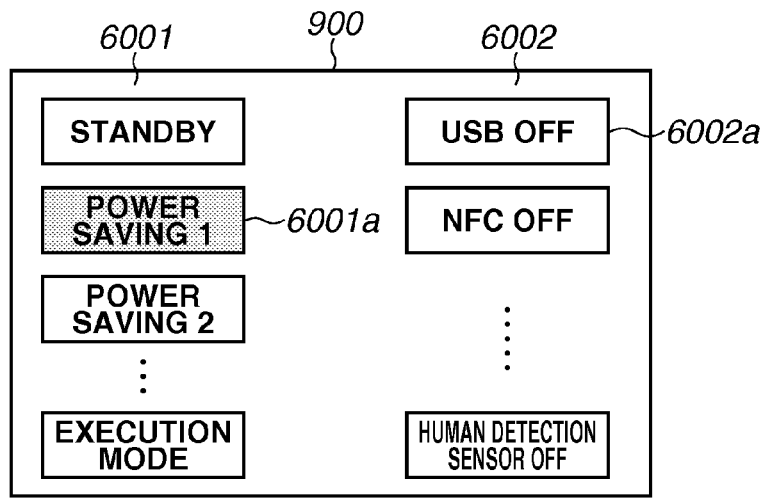
Figure 6C:
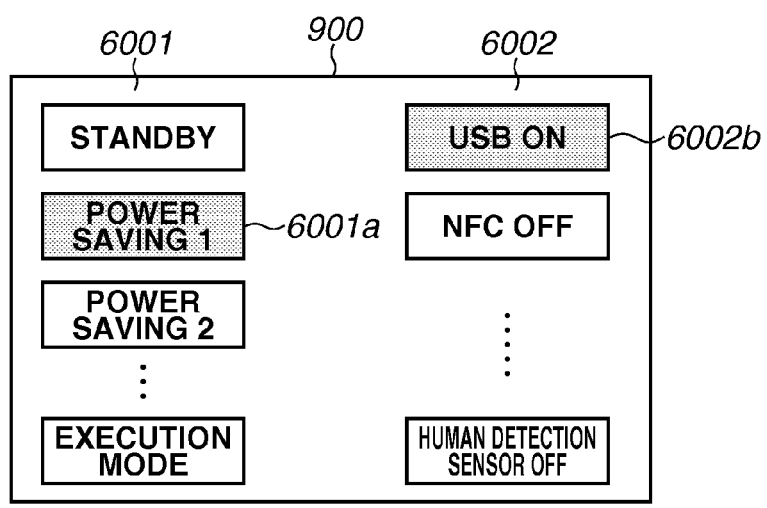

The user can set the power state of each of the detectors (e.g., the USB detector 411, the network detector 413, and the operation unit detector 414) for each power mode, as illustrated in FIGS. 6A to 6C (described below), by performing an operation on the operation unit 800 or a remote operation via an external interface such as a network or a USB interface.

When the user logs in to the image forming apparatus by using an administrator identification (ID), the above-described user settings can be permitted or prohibited by an operation on the operation unit 800 or a remote operation via an external interface such as a network or a USB interface.

FIGS. 6A to 6C are diagrams illustrating power state settings performed by the user.

The user can change the power state of each of the detectors for each power mode by performing a predetermined operation using the touch panel sheet of the LCD display unit 900. For example, when the user logs in from a menu, the image forming apparatus enters a predetermined option mode. The CPU 401 then displays each power mode on the left side of the touch panel sheet, as indicated by icons 6001 in FIG. 6A.

The user can select a power mode by tapping any of the icons 6001. Here, a description will be provided assuming that an icon 6001a "POWER SAVING 1" has been tapped. When the icon 6001a "POWER SAVING 1" has been tapped, the CPU 401 detects the tapping via the operation unit controller 406 and causes a transition to a screen illustrated in FIG. 6B.

As illustrated in FIG. 6B, upon selection of an icon indicating a desired power mode, icons 6002 for setting the power states of the detectors for the selected power mode appear on the right side of the screen. Here, the power state setting for "POWER SAVING 1" is displayed for each of the detectors.

The user can tap and select any of the icons 6002 for setting the power states of the detectors. Here, a description will be provided assuming that an icon 6002a "USB OFF" has been tapped. The icon 6002a "USB OFF" indicates that the power state of the USB detector 411 for "POWER SAVING 1" is set to the OFF state.

When the icon 6002a "USB OFF" has been tapped, the CPU 401 detects the tapping via the operation unit controller 406, and causes a transition to a screen illustrated in FIG. 6C. More specifically, the CPU 401 changes from the icon 6002a "USB OFF" to an icon 6002b "USB ON" to change the power state setting of the USB detector 411 for "POWER SAVING 1" to the ON state. Further, when the icon 6002b "USB ON" is tapped, the CPU 401 changes from the icon 6002b "USB ON" to the icon 6002a "USB OFF" again, so that the power state setting of the USB detector 411 for "POWER SAVING 1" can be returned to the OFF state.

The power states of two or more of the detectors may be linked to each other. For example, the power state of the USB detector 411 and the power state of the network detector 413 may be linked to each other. Further, the power state of the NFC unit and the power state of the human detection sensor may be linked to each other. The CPU 401 is assumed to perform control in such a way that when one of the detectors whose power states are linked to each other is set to OFF (ON), the other detector(s) is also set to OFF (ON).

The above-described power state setting of each of the detectors for each power state is assumed to be stored in the storage unit 4101 based on an instruction of the CPU 401, for example, when a setting change operation is performed, when a predetermined saving operation is performed, or when the screen illustrated in any of FIGS. 6A to 6C is closed. For example, a value is set in the register corresponding to "USB setting for POWER SAVING 1". For example, "1" is set for ON, and "0" is set for OFF. The settings of the linked detectors described above may be stored in the same register.

Setting changes by general users may be partially prohibited by administrator settings. For example, when changing "USB OFF" for "POWER SAVING 1" is prohibited, "USB OFF" is controlled not to change to "USB ON" and maintain "USB OFF" even if the icon 6002a "USB OFF" is tapped by a general user. Further, a message saying that the change is prohibited by the administrator may be displayed on the LCD display unit 900. Furthermore, control may be performed so that the icon corresponding to the setting prohibited from being changed is grayed out to prohibit general users from changing the setting.

Prohibition of a setting change by the administrator will be described below with reference to FIGS. 7A to 7C.

The detectors that detect the occurrence of transition factors include the above-described NFC unit, human detection sensor, in addition to the USB (the USB detector 411), the network (the network detector 413), and the operation unit detector 414. By setting the power state of each of the detectors for each power mode to ON or OFF, the user can select whether to prioritize the low power consumption (power saving) or the responsiveness (usability for the user) of the apparatus.

Restricting the user settings by the administrator will be described below with reference to FIGS. 7A to 7C.

FIGS. 7A to 7C are diagrams each illustrating power state settings and change permission/prohibition settings that are performed by the administrator.

There may be a case where, when a general user performs the power state setting of each of the detectors for a power mode, the setting conflicts with a power policy of a company, organization, or the like. In order to prevent the occurrence of such a case, the administrator can restrict the settings by users.

When the administrator logs in to the image forming apparatus by using a special account (such as a user ID registered as an administrator), the CPU 401 displays an administrator screen like a screen illustrated in each of FIGS. 7A to 7C on the LCD display unit 900. The administrator can place a restriction on the user settings by using this administrator screen. In other words, only the administrator can perform the power state settings and the change permission/prohibition settings by using the administrator screens illustrated in FIGS. 7A to 7C.

The difference between the administrator screens illustrated in FIGS. 7A to 7C and the screens (user screens) illustrated in FIGS. 6A to 6C will be described.

When any of icons 7001 indicating power modes is tapped on the administrator screen illustrated in FIG. 7A, icons 7002 and icons 7003 appear on the right side of the icons 7001, as illustrated in FIG. 7B. The icons 7002 are provided to perform the power state settings for the selected power mode, and the icons 7003 are provided to perform the change permission/prohibition settings for the selected power mode.

The administrator can lock the power state setting of any of the detectors by selecting the corresponding icon from the icon 7003 for the change permission/prohibition settings (by prohibiting the power state setting of the detector from being changed to OFF (or ON)), so that power settings that reflect the power policy of the company or the organization can be realized.

For example, when an icon 7001a "POWER SAVING 1" is tapped, the CPU 401 detects the tapping via the operation unit 800, and displays the power state settings and the change permission/prohibition settings of the detectors for "POWER SAVING 1", as indicated by the icons 7002 and 7003 in FIG. 7B. The example illustrated in FIG. 7B is a state in which the power state setting of the USB detector 411 for "POWER SAVING 1" is set to an icon 7002a "USB OFF", and the change permission/prohibition setting of the USB detector 411 is set to an icon 7003a "USB SETTING CHANGE PROHIBITED". This administrator setting disables changing the power state setting of the USB detector 411 to ON on the user screens illustrated in FIGS. 6A to 6C.

When the administrator taps the icon 7003a "USB SETTING CHANGE PROHIBITED" illustrated in FIG. 7B, the CPU 401 detects the tapping via the operation unit controller 406, and causes a transition to the screen illustrated in FIG. 7C. More specifically, the CPU 401 changes the icon 7003a "USB SETTING CHANGE PROHIBITED" to an icon 7003b "USB SETTING CHANGE PERMITTED", so that changing the power state setting of the USB detector 411 for "POWER SAVING 1" is permitted. Further, when the icon 7003b "USB SETTING CHANGE PERMITTED" is tapped, the CPU 401 changes the icon 7003b "USB SETTING CHANGE PERMITTED" to the icon 7003a "USB SETTING CHANGE PROHIBITED" again, so that changing the power state setting of the USB detector 411 for "POWER SAVING 1" can be prohibited again.

Although a description is not provided, the icons 7002 for the power state settings can also be set on the administrator screens illustrated in FIGS. 7A to 7C, in a manner similar to the user screens illustrated in FIGS. 6A to 6C.

In the description of FIGS. 6A to 6C and FIGS. 7A to 7C, the power state setting and the change permission/prohibition setting of the operation unit detector 414 are not mentioned. However, the power state setting and the change permission/prohibition setting of the operation unit detector 414 may be performed on the screens illustrated in FIGS. 6A to 6C and FIGS. 7A to 7C.

FIG. 8 is a flowchart illustrating the processing for setting the power state of each of the detectors in a power state transition of the image forming apparatus. The flowchart is implemented by the logic unit 4102 of the power supply controller 410, which executes a program written in advance. It is assumed here that the user settings illustrated in FIGS. 6A to 6C are preset in the image forming apparatus.

In step S8001, a power state transition is to occur in the image forming apparatus. Next, in step S8002, a factor for the transition is detected so that a power state after the transition (post-transition power state) is identified according to the detected transition factor. For example, in a case where a power state transition occurs due to the factor of not being used for a predetermined time or more, the CPU 401 detects the occurrence of the factor and identifies the post-transition power state. The CPU 401 then notifies the power supply controller 410 of the transition to a predetermined power saving mode. Alternatively, the power supply controller 410 may identify the post-transition power state.

Next, in step S8003, the logic unit 4102 of the power supply controller 410 acquires the power state setting of each of the detectors for the post-transition power state, from the register for each of the detectors which corresponds to the post-transition power state, and determines the value of the register. These registers are in the storage unit 4101, and store the user settings like those described with reference to FIGS. 6A to 6C.

If the value of a certain register corresponding to the post-transition power state is "1", then in step S8004, the logic unit 4102 controls the power state of the detector corresponding to the register to be ON (in the power-on state). On the other hand, if the value of the register is "0", then in step S8005, the logic unit 4102 controls the power state of the detector corresponding to the register to be OFF (in the power-off state).

The logic unit 4102 repeats the processing in step S8003 to step S8005 as many times as the number of the detectors.

More specifically, as for the register for each of the detectors corresponding to the post-transition power state, when the register has the value of "1", the logic unit 4102 sets the power state of the corresponding detector to ON in step S8004. On the other hand, when the register has the value of "0", the logic unit 4102 sets the power state of the corresponding detector to OFF in step S8005.

This will be further described below by taking the USB detector 411 as an example.

For example, when the normal operation mode (standby) is to be shifted to the power saving mode (e.g., "POWER SAVING 1"), then in step S8003, the logic unit 4102 refers to the value of the register corresponding to "setting of USB detector for POWER SAVING 1" stored in the storage unit 4101. If the value of the register is determined to be "1", then in step S8004, the logic unit 4102 sets the USB detector 411 to ON (the power-on state) via the USB (D) controller 405. On the other hand, if the value of the register is determined to be "0", then in step S8005, the logic unit 4102 sets the USB detector 411 to OFF (the power-off state (disconnected state)) via the USB (D) controller 405.

After the control for the power states of all the detectors is completed, in step S8006, the power supply controller 410 continues the processing for the power state transition. For example, the power supply controller 410 performs processing such as stopping power supply to the CPU 401, so that the power supply controller 410 executes necessary processing until the transition is completed in step S8007.

The power states in the controller controlling unit 400 after a power state transition of the image forming apparatus will be described in detail below with reference to FIGS. 9 and 10.

Figure 10:
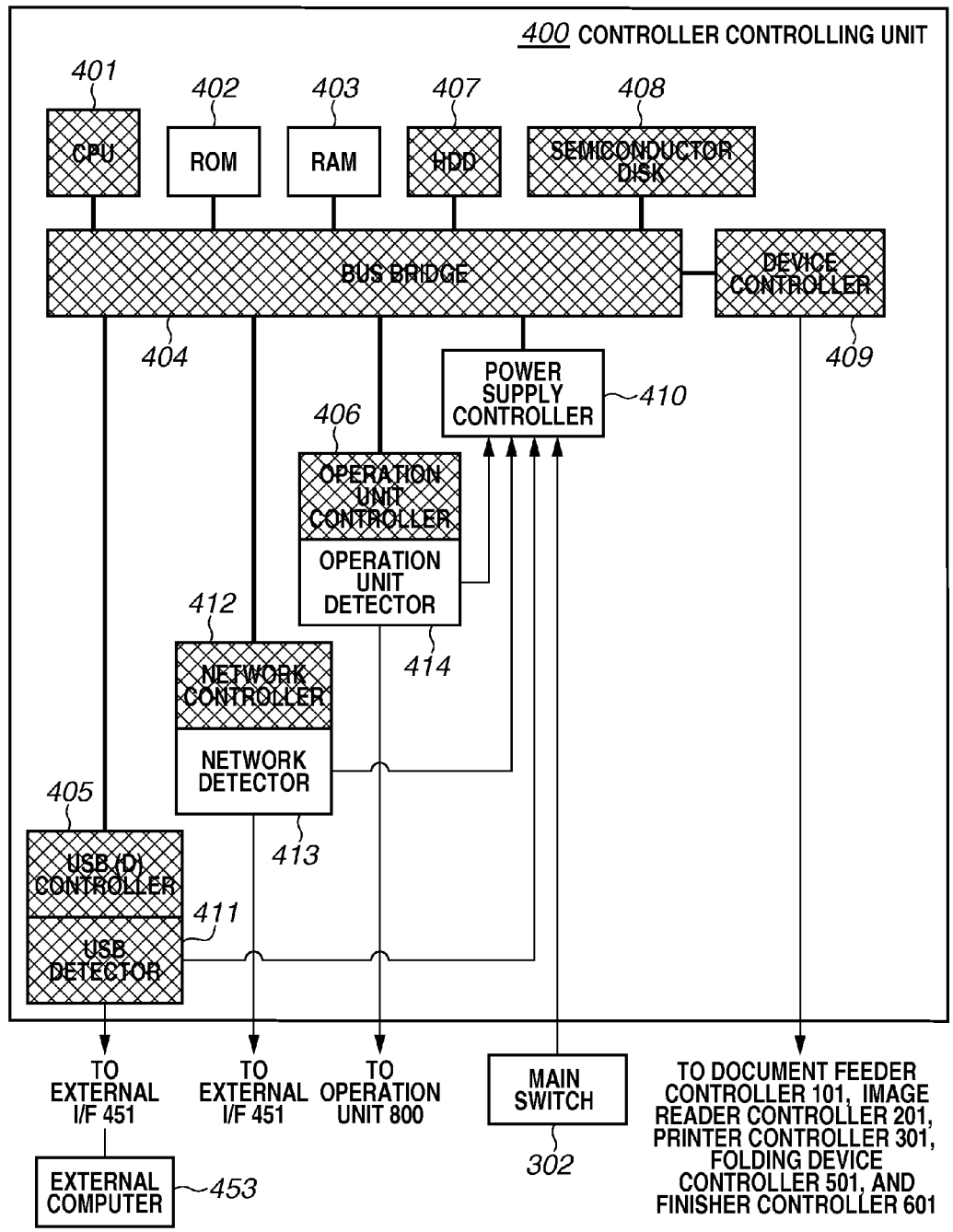
FIG. 10 is another diagram illustrating power states in the controller controlling unit after a power state transition.

FIGS. 9 and 10 are diagrams each illustrating the power states in the controller controlling unit 400 after a power state transition of the image forming apparatus. In FIGS. 9 and 10, a shaded part indicates the power-off state (non-energized state).

For example, assume that, in the user settings illustrated in FIGS. 6A to 6C, "USB ON" and "NETWORK OFF" are set for "POWER SAVING 1", and "USB OFF" and "NETWORK ON" are set for "POWER SAVING 2". A description will be provided below using this case.

In this case, when a transition to "POWER SAVING 1" has occurred, the USB detector 411 is controlled to be in the ON state, and the network detector 413 is controlled to be in the OFF state, as illustrated in FIG. 9. Therefore, a return due to the USB is enabled, but a return due to the network is disabled.

In contrast, when a transition to "POWER SAVING 2" has occurred, the USB detector 411 is controlled to be in the OFF state, and the network detector 413 is controlled to be in the ON state, as illustrated in FIG. 10. Therefore, a return due to the USB is disabled, but a return due to the network is enabled.

As a communication standard having bus power (power supply), other type of interface (communication standard) may be used in place of the above-described USB interface (USB standard). For example, a communication standard having bus power (power supply), such as FireWire, Institute of Electrical and Electronics Engineers (IEEE) 1394, and Thunderbolt may be employed. In this case, a detector for detecting a transition factor, which corresponds to the employed communication standard, is provided in place of the USB detector 411.

The above description provides the configuration in which the power state of each of the detectors is controlled to be ON or OFF according to the user settings in a power state transition of the image forming apparatus. However, the configuration is not limited to this. Each of the detectors has only to be controlled to be enabled or disabled. In other words, in a power state transition of the image forming apparatus, the power supply controller 410 may control each of the detectors to be enabled or disabled according to the user settings.

As described above, according to the present exemplary embodiment, the user can set, for each power mode of the image forming apparatus, the power states (energized (ON) state or disconnected (OFF) state) of the detectors for detecting transition factors. When a power mode transition of the image forming apparatus is to occur due to an external factor, the transition is performed after the power states of the detectors for detecting transition factors are controlled according to the user settings. In such a configuration, the user can easily select whether to prioritize the low power consumption (power saving) or the responsiveness (usability) of the image forming apparatus and appropriately implement the lower power consumption and the responsiveness.

In addition, the administrator can restrict the above-described user settings, so that the power control of the image forming apparatus can be performed according to the policy of the company or the organization where the image forming apparatus is installed.

As described above, according to the exemplary embodiment of the present invention, the image forming apparatus, which can shift to and operate in one of a plurality of power modes, is configured to allow the user to set the components for detecting the occurrence of shifting factors to ON or OFF, so that the user can select whether to prioritize the low power consumption or the responsiveness. In addition, the administrator can set the prohibition or permission of such settings, and therefore the power and the responsiveness complying with a policy and the like can be achieved. The above-described exemplary embodiment allows the user to select whether to prioritize the power saving or the responsiveness (usability) of the image forming apparatus, and can also achieve a balance between the power saving and the responsiveness (usability) of the image forming apparatus according to the usage environment.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-126270, filed Jun. 19, 2014, which is hereby incorporated by reference herein in its entirety.

What is claimed is:

1. An image forming apparatus configured to operate in a plurality of power modes, the image forming apparatus comprising:
    a Universal Serial Bus (USB) detector having a power state and configured to receive predetermined data to shift a power mode of the image forming apparatus to a normal power mode from a power saving mode;
    a network detector having a power state and configured to receive predetermined data to shift the power mode of the image forming apparatus to the normal power mode from the power saving mode;
    a display configured to receive user input to set both the power state for the USB detector and the power state for the network detector in the power saving mode; and
    a power supply controller configured to, when a condition for shifting the power mode of the image forming apparatus from the normal power mode to the power saving mode is satisfied, (1) stop power to the USB detector and the network detector, (2) stop power to the USB detector and continue supplying power to the network detector, (3) stop power to the network detector and continue supplying power to the USB detector, or (4) continue supplying power to the USB detector and the network detector, based on the user input received by the display,
    wherein the USB detector is configured to receive the predetermined data from a USB host device through a USB interface that is external to the image forming apparatus and the network detector is configured to receive the predetermined data through a USB interface, and
    wherein, in response to disconnection of the USB host device from the image forming apparatus, the power mode of the image forming apparatus is shifted from the normal power mode to a power saving mode in which the network detector continues to receive power.

2. The image forming apparatus according to claim 1, further comprising a key which receives a user instruction to cause the image forming apparatus to return from the power saving mode to the normal power mode,
    wherein, based on the key having received the user instruction, the power supply controller performs control so that power supply to the USB detector and power supply to the network detector are performed.

3. A method for controlling an image forming apparatus configured to operate in a plurality of power modes and having a Universal Serial Bus (USB) detector having a power state and configured to receive predetermined data to shift a power mode of the image forming apparatus to a normal power mode from a power saving mode, a network detector having a power state and configured to receive predetermined data to shift the power mode of the image forming apparatus to the normal power mode from the power saving mode, and a display, the method comprising:
    receiving user input to set both the power state for the USB detector and the power state for the network detector in the power saving mode; and
    controlling power, wherein, when a condition for shifting the power mode of the image forming apparatus from the normal power mode to the power saving mode is satisfied, controlling power includes controlling power to (1) stop power to the USB detector and the network detector, (2) stop power to the USB detector and continue supplying power to the network detector, (3) stop power to the network detector and continue supplying power to the USB detector, or (4) continue supplying power to the USB detector and the network detector, based on the user input received by the display,
    wherein the USB detector is configured to receive the predetermined data from a USB host device through a USB interface that is external to the image forming apparatus and the network detector is configured to receive the predetermined data through a USB interface, and
    wherein, in response to disconnection of the USB host device from the image forming apparatus, the power mode of the image forming apparatus is shifted from the normal power mode to a power saving mode in which the network detector continues to receive power.

4. The method according to claim 3, further comprising receiving, via a key, a user instruction to cause the image forming apparatus to return from the power saving mode to the normal power mode,
    wherein, based on the key having received the user instruction, the power supply controller performs control so that power supply to the USB detector and power supply to the network detector are performed.

5. The image forming apparatus according to claim 1, further comprising a printer which prints an image on a sheet.

6. The image forming apparatus according to claim 1, wherein the display displays a screen for receiving the user's input.

7. The image forming apparatus according to claim 1, wherein the network detector is connected to a network interface which receives the user's input from an external device other than a USB host device.

8. The image forming apparatus according to claim 1, wherein the display receives instructions from an administrator user that causes the display to prohibit a general user from selecting whether to stop power supply to the USB detector.

9. The image forming apparatus according to claim 1, wherein the USB detector and the network detector each are configured to operate with only enough power to detect a return factor as the predetermined data receive from a USB host device.

10. The image forming apparatus according to claim 1, wherein the power state of the USB detector and the power state of the network detector are linked to each other.

* * * * *